United States Patent [19]

Levin

[11] Patent Number: 4,760,528

[45] Date of Patent: Jul. 26, 1988

[54] METHOD FOR ENTERING TEXT USING ABBREVIATED WORD FORMS

[76] Inventor: Leonid D. Levin, 106 Deborah Rd., Newton, Mass. 02159

[21] Appl. No.: 777,311

[22] Filed: Sep. 18, 1985

[51] Int. Cl.$^4$ .................. B41J 5/30; G06F 15/38
[52] U.S. Cl. ............................. 364/419; 400/98
[58] Field of Search ... 364/200 MS File, 900 MS File, 364/419, 709; 400/98

[56] References Cited

U.S. PATENT DOCUMENTS

| | | | |
|---|---|---|---|
| 3,950,734 | 4/1976 | Li | 364/900 |
| 4,374,625 | 2/1983 | Hanft et al. | 400/98 |
| 4,396,992 | 8/1983 | Hayashi et al. | 364/900 |
| 4,459,049 | 7/1984 | Howell et al. | 400/98 |
| 4,464,070 | 8/1984 | Hanft et al. | 400/98 |

OTHER PUBLICATIONS

Todd, S. J. P., "Abbreviated Typing for Word Processing", IBM Tech. Discl. Bull., vol. 21, No. 9, Feb. 1979, 3796–7.

Primary Examiner—Jerry Smith
Assistant Examiner—Clark A. Jablon

[57] ABSTRACT

An abbreviated text entering system is described which provides a plurality of files each of which includes a full text word and a corresponding abbreviated word. In each of the files the abbreviated word is formed using a different rule, and at least one file is provided for words of five or more characters, a different file is provided for words including one of a plurality of predefined prefixes, a further file is provided for words including one or more predefined suffixes, and another file is provided for words which include one of a plurality of predefined prefixes and one of a plurality of predefined suffixes. Entered text is compared with the abbreviated word forms, and on a match, that full text word corresponding to the matched abbreviated text is stored in lieu of the entered text.

6 Claims, 5 Drawing Sheets

METHOD FOR ENTERING TEXT USING ABBREVIATED WORD FORMS

BACKGROUND OF THE INVENTION

At a time when computer products offer cost-effective solutions to most spheres of our business and life, nothing has been invented to use them to improve efficiency of inputting alphabetic information entered in every computer system.

At the present time, only one typing method is available, namely character-by-character input. The Computerscript method allows reduction of input time by up to 60%.

It can be used as a new computerized shorthand system to eliminate manual writing and transcribing and, more importantly, as a new typing standard.

SUMMARY OF THE INVENTION

The invention involves a method of entering alphabetic information and operating a digital computer to produce a readable text from an abbreviated form to full word form. All words of the English language are broken down into five categories or word structures:
(1) Four character words;
(2) Five and over five character words;
(3) Prefix words;
(4) Suffix words;
(5) Prefix/Suffix words.

Respectively, the dictionary file consists of five major files according to the categories described above. Each file has a number of records and every record consists of an abbreviated and full word. Also, there is a phrase file which stores 100 of the most frequently used phrases.

The input process begins by entering alphabetic information through standard computer keyboards into the main memory.

During the next phase, the computer determines the category of the word entered and a corresponding file is then searched for the abbreviation keyed in. Once the correspondence has been established, the computer prints out the full word. The process repeats until all text is output.

The following rules are used to input information.
(1) Three first characters for 4 character words.
(2) Two first and two last characters for 5 and over 5 character words.
(3) A special character for the suffix and first 3 characters for the words with a suffix.
(4) A special character for the prefix and next 3 characters for the words with a prefix.
(5) A special character for the prefix, a special character for the suffix plus 3 characters between them for words containing both a prefix and suffix.

A principal feature of this invention is a new input language associated with a standard computer keyboard which enhances the internal operation of the digital computer. The existing language associated with current keyboards is a full character-by-character input which means, for example, entering a 13 character word requires 13 strokes. However, Computerscript allows only 4 or 5 strokes.

An important invention aspect of the enhancement of a digital programmable computer system is fulfilled by reducing computer memory size since making fewer strokes results in fewer memory locations required to store information being entered and decreasing the access time of a specific word in the computer data dictionary by searching for the word according to the methods claimed as opposed to sequential or alphabetical approaches.

DETAILED DESCRIPTION

General Description

Figure 1:
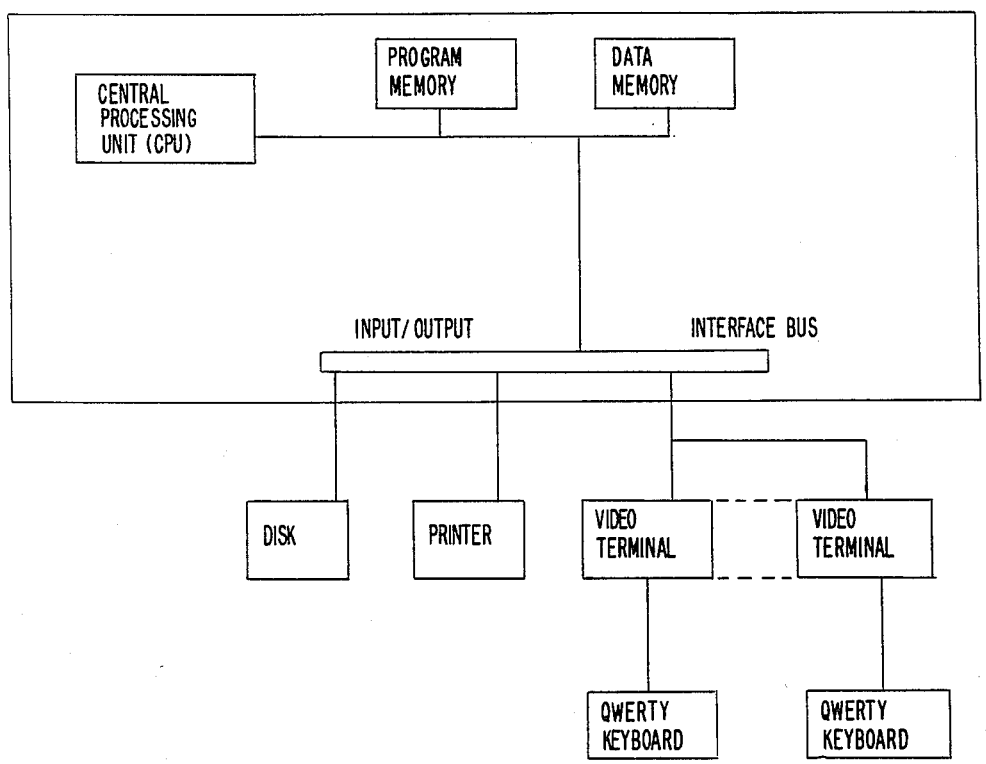
FIG. 1 is a block diagram of the overall system of the invention.

FIG. 1 is a block diagram of a programmable digital computer system. Included are hardware and computer programs, the latter stored in program memory, for entering abbreviated information, retrieving full words and printing of readable text.

Figure 2:
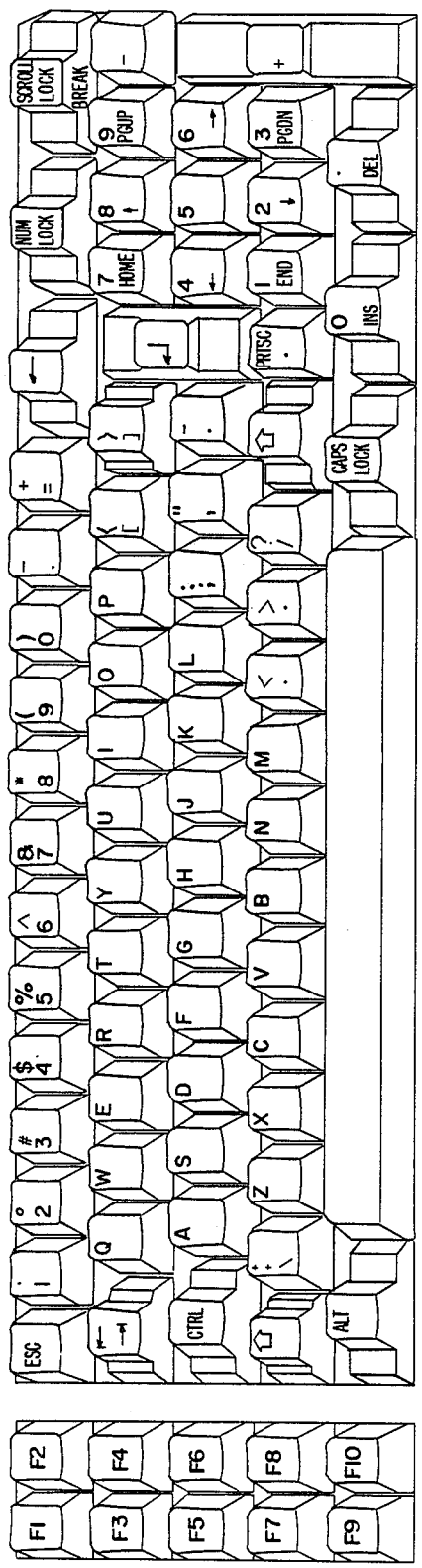
FIG. 2 is a QWERTY keyboard used to enter alphabetic information according to the rules of the invention.

The alphabetic information keyed in is textual data arranged into records and blocks. Referring to FIG. 2, a standard computer keyboard is used to enter alphabetic information according to rules described herein. In the computer industry, such a keyboard is frequently called a "qwerty keyboard." The data base dictionary of full English words is stored in files on disk storage which is comprised of about 7000 words and 100 phrases most often used in business correspondence.

Figure 3:
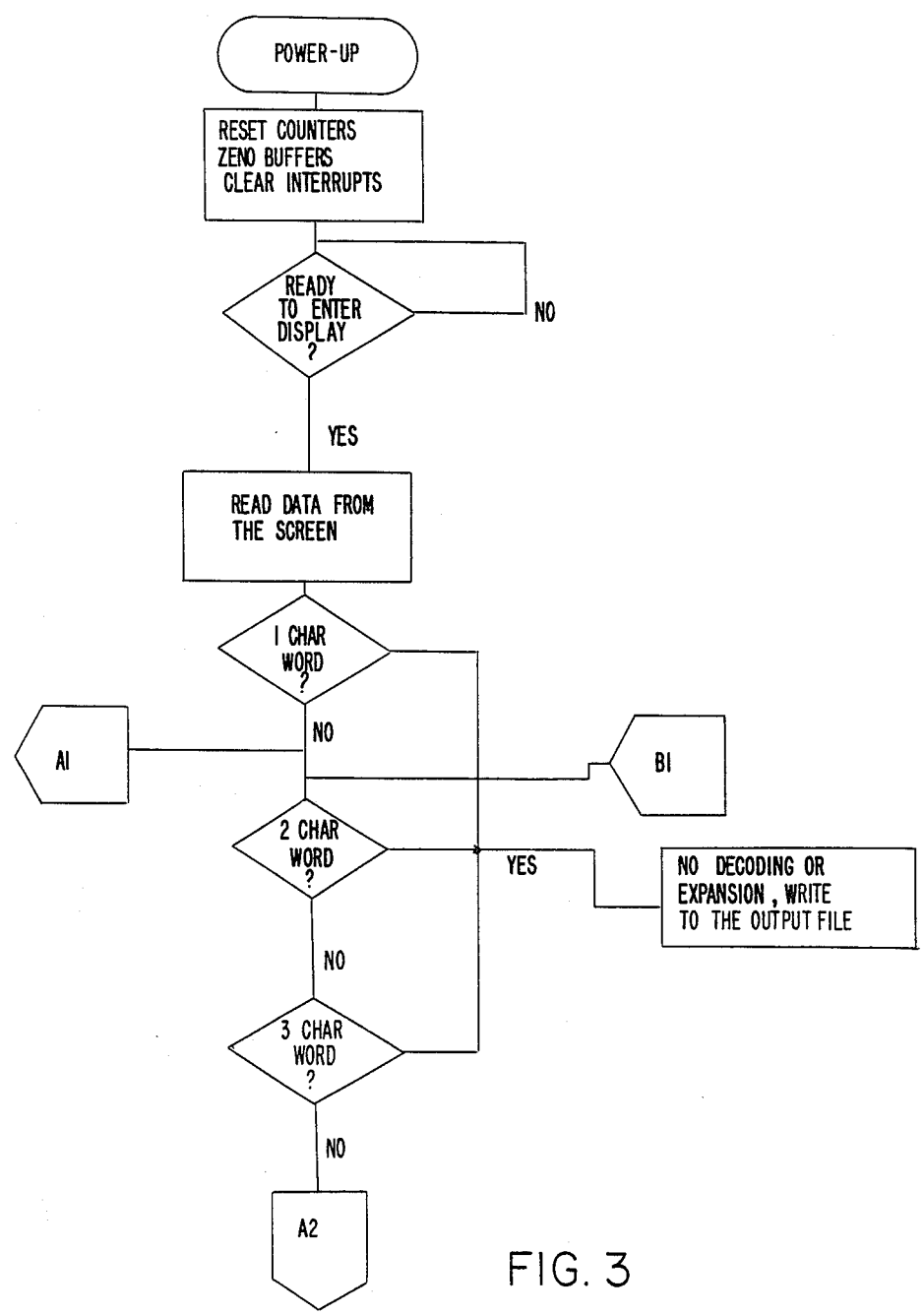
FIGS. 3 and 4 are flow diagrams for implementing the steps in the method of the invention.
Figure 4:
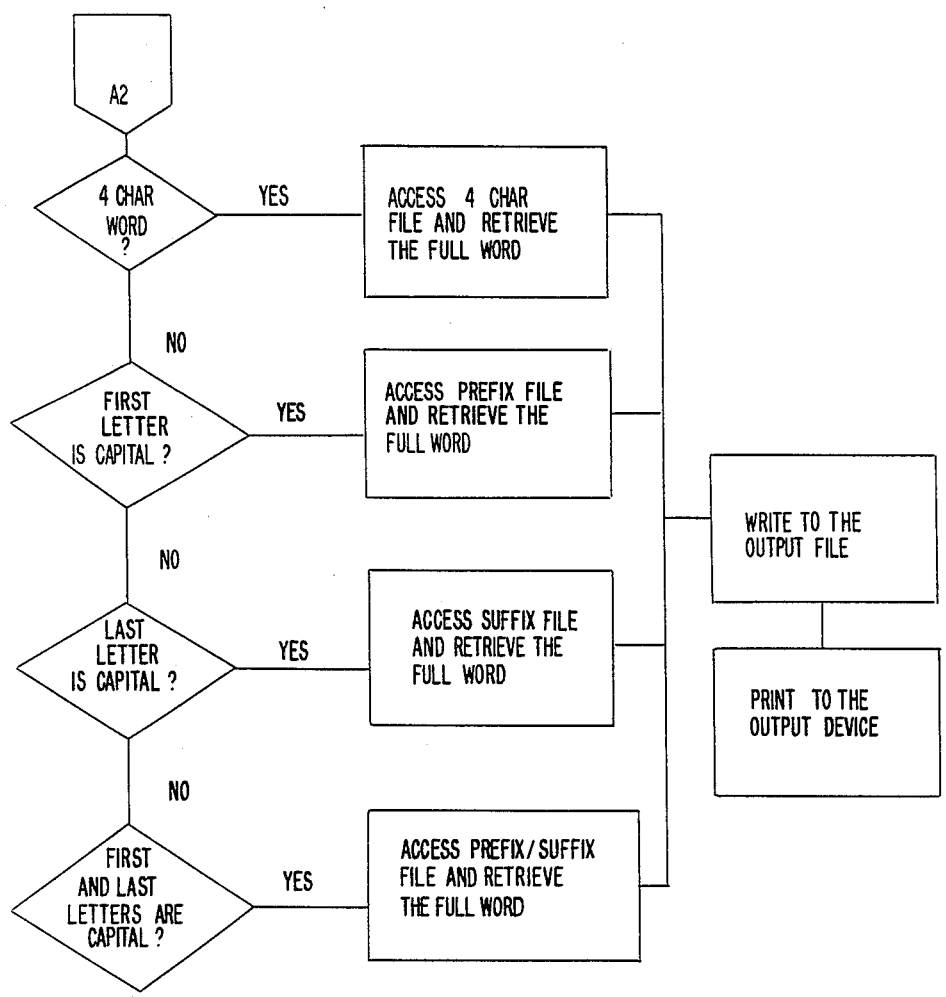
Figure 5:
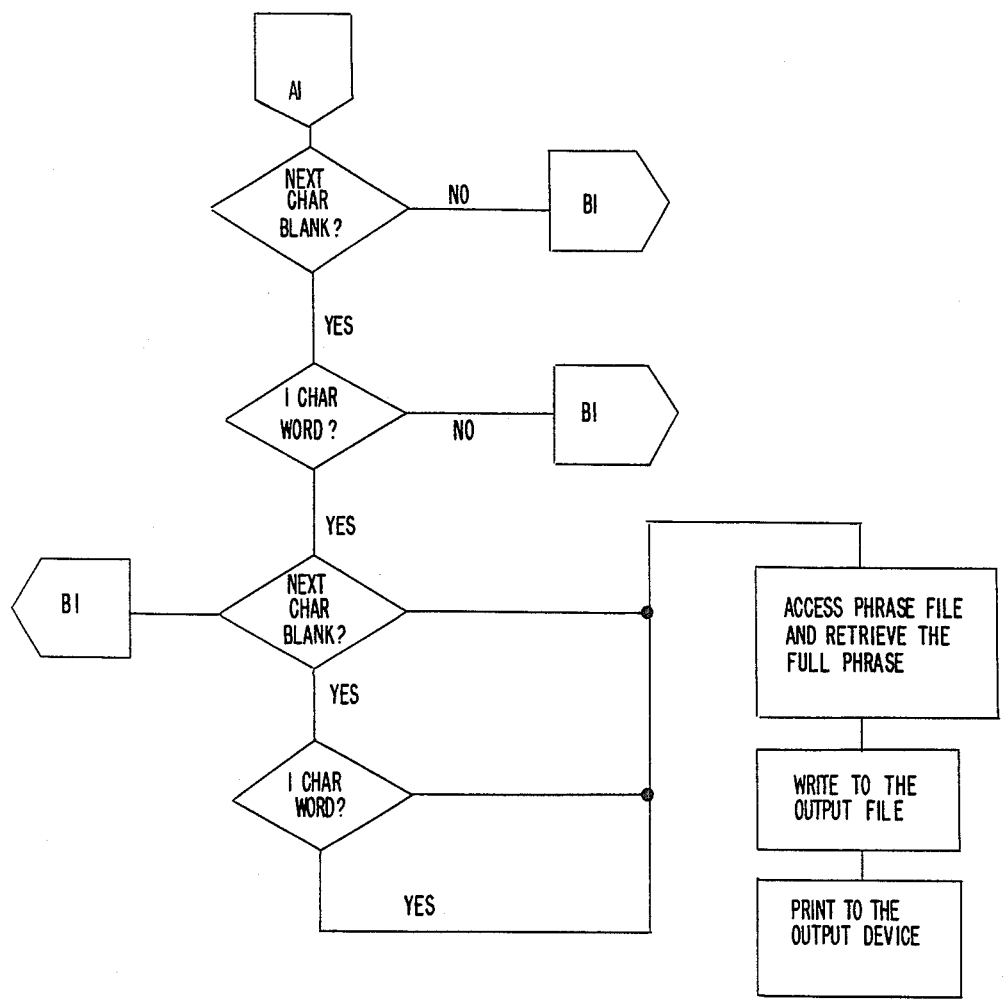
FIG. 5 is an overall flow diagram of the steps for accessing a particular file.

FIGS. 3 and 4 are overall flow diagrams of a method of operation according to the present invention. Depending on the length and composition of the abbreviation, the computer accesses a particular file (FIG. 5) within a file. Using internal pointers, it searches for a match between an abbreviation entered and the one stored in the file. When the match is found, the full word is output to a file containing readable text.

File Structure

The data base dictionary consists of five major files containing:
A file storing 4 character words;
A file storing 5 and over 5 character words;
A file storing words with pre-defined prefixes;
A file storing words with pre-defined suffixes;
A file storing words with pre-defined suffixes and prefixes.

The files consist of records having the following format:

| | |
|---|---|
| 4 Char word file | able a b l |
| 5 and over 5 Char word file | aircraft a i f t |
| Prefix word file | conclusion N c l u |
| Suffix word file | acceptance a c c C |
| Prefix/Suffix word file | compensation M p e n H |

Phrase file

-continued

| I do not believe | I d b |

Information Input

The information is entered using the following rules:
(1) Three first characters for 4 character words;
(2) Two first and two last characters for 5 and over 5 character words (to be referred to as 2+2 rule);
(3) A special character for the suffix and 3 characters for the words with a suffix;
(4) A special character for the prefix and 3 characters for the words with a prefix;
(5) A special character for the prefix and a special character for the suffix plus 3 characters between them for the words containing a prefix and suffix.

Words of 1, 2 and 3 character length are entered unabbreviated.

The information should appear on the screen in abbreviated form while being entered.

Syntax of input is a conventional English language syntax. For example, a sentence, "The ball is round," should be abbreviated "bal is rond." The system software should allow the user to establish his/her own abbreviations by assigning two character abbreviations to each "Buzz" word. Times, dates, geographical terms and names should be entered unchanged.

Geographical terms and names should start with a capital letter.

If a word to be entered starts with a capital letter, it should be printed out with a starting capital letter.

If a word consists of all capital characters, it should be printed out with all capital characters.

Plurals Input

Regular words (words without prefixes and suffixes), are treated according to the category they fall under. For instance, the word "aircrafts," the 2+2 rule is applied and abbreviated as "aits." Another example would be the word "areas." It is a 4 character plural which becomes a 5 character word and the 2+2 rule is applied and abbreviated as "aras."

For prefix plurals, the prefix rule is used and "s" is added to the abbreviation. For example, the word "concerns" is abbreviated "Ncers."

For suffix plurals, the suffix rule is used and "s" is added to the abbreviation. For example, the word "corporations" is abbreviated as "corHs." Also, it seems to be acceptable that the user would apply the 2+2 rule and the word "corporations" could be abbreviated as "cons."

For prefix/suffix plurals, the prefix/suffix rule is used and "s" is added to the abbreviation. For instance, the word "conditions" is abbreviated as "NditHs."

Phrase Input

The user should be enabled to enter pre-defined phrases in abbreviated form and the software will be able to print out the full phrase. For example, a phrase, "I do not believe" would be abbreviated as "I d b." When the software reads two or more one character abbreviations separated by blanks, it is an indication that a phrase has been entered.

Information Output

The information output should allow a user a choice of output device, i.e., file, display, printer.

The system should retain the format of the input. If information is entered in the format of a letter, the output should be in a format of a letter.

When the system finds more than one full word corresponding to one abbreviation, it should display all of them, put the cursor under the first word in the line and allow the user to pick out the necessary word.

ComputerScript Summary

| | |
|---|---|
| 1. 4 Char Rule | Suffix Table |
| 3 First Chars: Ball - Bal | able - B |
| 2. 5 Char Rule | al - A |
| 2 First + 2 Last: | ance - C |
| Aircraft = Aift | ate - T |
| 3. Prefix Rule | ed - D |
| Prefix Char + 3 | ence - E |
| next Chars | er - R |
| Conclusion = Nclu | es - S |
| 4. Suffix Rule | ent - N |
| 3 first Chars + suffix | ing - G |
| Char | ive - V |
| Development = DevM | ly - L |
| 5. Prefix/Suffix Rule | ment - M |
| Prefix Char + 3 next | or - O |
| Chars + suffix Char | ry - Y |
| Consolidation = NsolH | tion - H |
| Prefix Table | ty - T |
| com - M | Plurals |
| con - N | 1. 4 Char word plurals become |
| de - D | 5 Char word and 2 + 2 |
| in - I | is applied. |
| pro - O | 2. 5 Char plurals - 2 + 2 |
| re - E | is applied. |
| ex - X | 3. Prefix plurals - prefix |
| un - U | Char + 3 next Char + S. |
| | 4. Suffix plurals are abbreviated by 2 + 2 rule. |
| | 5. Prefix/suffix plurals - prefix Char + 3 next Char + S. |

NOTE:
1. Time and dates to be entered as is.
2. Names, geographical terms to be entered as is.
3. Prefix and Suffix characters are entered as capital characters.

TABLE 1

| Pre-Defined Suffixes |
|---|
| able - B |
| al - A |
| ance - C |
| ate - T |
| ed - D |
| ence - E |
| er - R |
| es - S |
| ent - N |
| ing - G |
| ive - V |
| ly - L |
| ment - M |
| or - O |
| ry - Y |
| tion - H |
| ty - T |

TABLE 2

| Pre-Defined Prefixes |
|---|
| com - M |
| con - N |
| de - D |
| in - I |
| pro - O |
| re - E |
| ex - X |
| un - U |

TABLE 3
List of Pre-defined Phrases

| | |
|---|---|
| about the—a t | was not—w n |
| all of them—a o t | we are—w a |
| are not—a n | we are not—w r n |
| as good as—a g a | we can—w c |
| as low as—a l a | we do not—w d n |
| as many as—a m a | we do not believe—w d b |
| as you—a y | we have—w h |
| as well as—a w a | we have been—w h b |
| at all—a a | we have not—w h n |
| at any time—a a t | we must—w m |
| at once—a o | we shall not—w s n |
| does not—d n | we shall be—w s b |
| for the—f t | we should—w s |
| for us—f u | we will—w w |
| from the—f t | we will not—w w n |
| from your—f y | what to do—w t d |
| have been able—h b a | when the—w t |
| he is—h i | which is—w i |
| he had—h h | will be able—w b a |
| he was not—h w n | with you—w y |
| he will—h w | with us—w u |
| I do not—I d n | would be able—w b a |
| I do not believe—I d b | you are—y a |
| I do not know—I d k | you do not—y d n |
| I do not see—I d s | you do not know—y d k |
| I have—I h | you have—y h |
| if you are—i y a | you know—y k |
| if you will—i y w | your letter—y l |
| in reply—i r | you may—y m |
| in which—i w | you would—y w |
| into the—i t | it must be—i m b |
| is not—i n | I was not—I w n |
| it may be—i m b | more than—m t |
| it is not—i i n | must be— |
| there is—t i | of it—o i |
| there is not—t i n | of its—o i |
| they do not—t d n | of them—o t |
| they do not know—t d k | of which—o w |
| they had—t h | on our—o u |
| through the—t t | on the—o t |
| to draw—t d | on your—o y |
| to get—t g | over the—o t |
| to keep—t k | should be—s b |
| to mean—t m | should be able—s b a |
| to place—t p | that is—t i |
| to ship—t s | that they—t t |
| to which—t w | there are—t a |

I claim:

1. A method for entering alphabetic information in abbreviated form and for producing automatic print-out of full readable text by using a programmable digital computer system, comprising the steps of:
   (A) Presenting words in one of the following categories:
   (i) Five and over five character words;
   (ii) Prefix words having at least three characters in addition to a prefix;
   (iii) Suffix words having at least three characters in addition to a suffix;
   (iv) Prefix/suffix words;
   (B) Entering and storing alphabetic information using the following rules, each rule corresponding to a respective said category:
   (i) Two first and two last characters for five and over five character words;
   (ii) A special character for the prefix and next 3 characters for words with a prefix;
   (iii) A special character for the suffix and first 3 characters for words with a suffix;
   (iv) A special character for the prefix, a special character for the suffix plus 3 characters between them for words containing both prefix and suffix; and
   (C) Scanning and comparing according to the categories and rules of (A) and (B) such stored abbreviated words with full word dictionaries and for each such abbreviated word for which a match is established, storing the full words found in a file of computer memory.

2. The method of claim 1 which includes a step of printing said full words found in step (C).

3. A method of rapidly entering alphabetic information comprising the steps of:
   (a) providing a plurality of files of retrievable word abbreviations and corresponding full text words, each such file including word abbreviations formed under a different rule, said plurality of files including at least first, prefix and suffix files,
   (a1) said first file including words of at least five characters,
   (a2) said prefix file including words with one of a plurality of predefined prefixes and at least three characters in addition to a prefix, and
   (a3) said suffix file including words with one of a plurality of predefined suffixes and at least three characters in addition to a suffix,
   (b) entering text as a sequence of alphabetic characters selected in one of at least three forms, comprising:
   (b1) a sequence of first and last pairs of characters for words in said first file,
   (b2) a sequence of a character identifying one of said prefixes and three following characters for words in said prefix file, and
   (b3) a sequence of three characters followed by a character identifying one of said suffixes for words in said suffix file,
   (c) comparing text entered in said step (b) with entries in said files, and
   if a match is found between said entered text and an abbreviated word in one of said files, then storing, that full text word in said file associated with an abbreviated word matched with said entered text, in lieu of said entered text.

4. A method as recited in claim 3 wherein said plurality of files include a prefix/suffix file including words with one of said plurality of predefined prefixes and one of said plurality of predefined suffixes and at least three characters in addition to prefix and suffix,
   and wherein there are at least four forms in which text may be entered including:
   (b4) a sequence of a character identifying one of said prefixes followed by three characters followed by another character identifying one of said suffixes.

5. A method as recited in claim 3 wherein said comparing step (c) includes
   examining said entered text to determine which one of said files is to be used for said comparison.

6. A method as recited in claim 3 further comprising printing, in lieu of said entered text, that full text word stored in said step (c).

* * * * *